US008243576B2

(12) United States Patent
Minamiguchi et al.

(10) Patent No.: US 8,243,576 B2
(45) Date of Patent: Aug. 14, 2012

(54) OPTICAL DISC DEVICE AND PLAYING METHOD OF OPTICAL DISC (75) Inventors: Shuichi Minamiguchi, Tokyo (JP); Hiroharu Sakai, Tokyo (JP); Hajime Nishimura, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/952,435

(22) Filed: Nov. 23, 2010

(65) Prior Publication Data

US 2011/0158068 A1 Jun. 30, 2011

(30) Foreign Application Priority Data

Dec. 25, 2009 (JP) ................................. 2009-294190

(51) Int. Cl.
*G11B 7/00* (2006.01)

(52) U.S. Cl. .................................... 369/116; 369/53.26

(58) Field of Classification Search .................. 369/116, 369/47.5–47.53, 53.26, 53.27
See application file for complete search history.

(56) References Cited

U.S. PATENT DOCUMENTS

| 5,386,409 | A | * | 1/1995 | Yokota et al. ................. 369/116 |
| 6,421,314 | B1 | * | 7/2002 | Maruyama .................... 369/116 |
| 2005/0286392 | A1 | * | 12/2005 | Kamei .......................... 369/121 |
| 2006/0262672 | A1 | * | 11/2006 | Kayama et al. ............. 369/44.11 |
| 2007/0121446 | A1 | * | 5/2007 | Shiozawa et al. ............ 369/47.5 |
| 2009/0109815 | A1 | * | 4/2009 | Usui et al. .................. 369/47.28 |
| 2009/0245045 | A1 | * | 10/2009 | Doi ............................. 369/47.5 |
| 2010/0020661 | A1 | * | 1/2010 | Uchino et al. .............. 369/53.31 |
| 2010/0226218 | A1 | * | 9/2010 | Nakamura et al. .......... 369/47.5 |
| 2010/0232271 | A1 | * | 9/2010 | Muto et al. ................. 369/47.19 |

FOREIGN PATENT DOCUMENTS

| JP | 2008-112578 | 5/2008 |
| JP | 2009-110602 | 5/2009 |

* cited by examiner

*Primary Examiner* — Thang Tran
(74) *Attorney, Agent, or Firm* — Antonelli, Terry, Stout & Kraus, LLP.

(57) ABSTRACT

To determine the optimum amplitude of high frequency signal for the loaded disc with a simple configuration to achieve stable playing performance, there is provided an optical disc device comprising: a light source driven by a drive signal with a high frequency signal superimposed; a detector for detecting return light emitted from the light source; and a controller for controlling amplitude of the high frequency signal to be superimposed on the drive signal for the light source; the optical disc device being configured to read data on an optical disc loaded therein by a signal outputted from the detector, wherein the controller determines the amplitude of the high frequency signal to be superimposed on the drive signal based on asymmetry of the signal outputted from the detector.

8 Claims, 4 Drawing Sheets

| HF SETTING | 0 | 30 |
|---|---|---|
| BD-ROM | 30 | 10 |
| BD-R(A) | 17 | 15 |
| BD-R(B) | 3 | 3 |

OPTICAL DISC DEVICE AND PLAYING METHOD OF OPTICAL DISC

CLAIM OF PRIORITY

The present application claims priority from Japanese patent application JP 2009-294190 filed on Dec. 25, 2009, the content of which is hereby incorporated by reference into this application.

BACKGROUND OF THE INVENTION

This invention relates to an optical disc device, and in particular, relates to an optical disc device that can optimally adjust the amplitude of a high frequency signal to be superimposed on a drive signal of a laser beam source to reduce laser noise.

An optical disc device shines a laser beam emitted from a laser beam source onto an optical disc to play data recorded on the optical disc with laser light reflected on the surface of the optical disc. Because of the structure of the optical disc device, a part of the return light from the optical disc enters the laser beam source. The return light may remarkably increase noise in the laser beam. Hence, the optical disc device superimposes a high frequency signal onto a drive signal of the laser beam source so that the laser beam source emits an intermittent beam modulated with the high frequency signal, not a continuous beam, and the timing of the emission of laser beam is staggered from the timing of the entrance of return light to suppress variation of the intensity of the laser beam (for example, refer to JP2008-112578A and JP2009-110602A).

As described above, superimposition of high frequency in playing an optical disc provides stable playing performance. However, when the amplitude of the high frequency signal to be superimposed on the laser beam source is smaller and the laser beam is less modulated, the laser noise might not be sufficiently reduced even though a high frequency is superimposed. For example, variation of characteristics of laser diodes or variation of characteristics of optical systems may cause insufficient modulation. If the laser noise is not sufficiently reduced by these causes, data recorded on the optical disc may not be able to be played.

On the other hand, when an optical disc is played with a high frequency signal having excessive amplitude superimposed, the data recorded on the optical disc might be destroyed. Therefore, it has been desired that the amplitude of the high frequency signal to be superimposed be smaller to suppress the peak power of the laser beam.

For this reason, the amplitude of the high frequency signal is required to be adjusted to achieve an optimum modulation.

Conventionally, a method of determining the amount of high frequency signal to be superimposed based on the error rate of data read from an optical disc has been proposed. To measure the error rate, it is disadvantageously necessary to play the data from the optical disc (namely, to perform processes up to decoding). Before adjusting the amount of high frequency signal to be superimposed, adjustments of tracking and others are required, taking much time until determination of the amount of high frequency signal to be superimposed.

In addition, it is necessary to play data in a certain zone continuously for calculating the error rate; it took time to read the data for calculation of the error rate. Accordingly, a method for quick determination of the amount of high frequency signal to be superimposed has been desired.

In the meanwhile, a method of determining the amount of high frequency signal to be superimposed based on the amount of laser noise has been proposed. To measure the amount of laser noise, however, a dedicated detector which can detect a high frequency signal; the configuration of the optical disc device becomes complicated to increase costs.

An object of this invention is quick determination of the optimum amplitude of high frequency signal for the loaded disc with a simple configuration to achieve stable playing performance.

SUMMARY OF THE INVENTION

A representative aspect of this invention is as follows. That is, there is provided an optical disc device comprising: a light source driven by a drive signal with a high frequency signal superimposed; a detector for detecting return light emitted from the light source; and a controller for controlling amplitude of the high frequency signal to be superimposed on the drive signal for the light source; the optical disc device being configured to read data on an optical disc loaded therein by a signal outputted from the detector, wherein the controller determines the amplitude of the high frequency signal to be superimposed on the drive signal based on asymmetry of the signal outputted from the detector.

According to an aspect of this invention, the optimum amplitude of high frequency signal for a loaded disc can be determined with a simple configuration.

BRIEF DESCRIPTION OF THE DRAWINGS

The present invention can be appreciated by the description which follows in conjunction with the following figures, wherein.

DETAILED DESCRIPTION OF THE EMBODIMENTS

Figure 1:
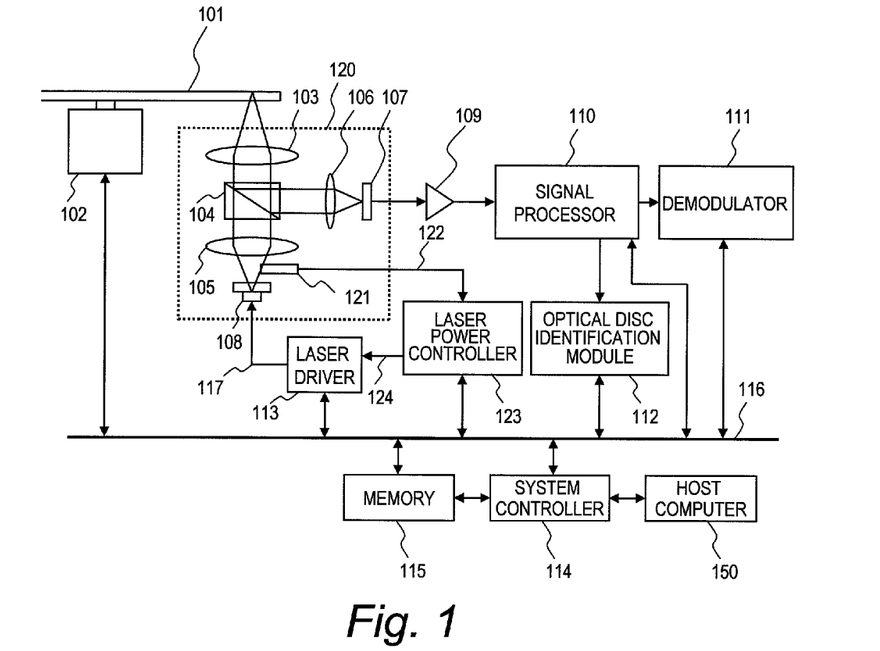
FIG. 1 is a block diagram illustrating a configuration of an optical disc device according to an embodiment of this invention.

FIG. 1 is a block diagram illustrating a configuration of an optical disc device 100 according to an embodiment of this invention.

The optical disc device 100 in this embodiment is coupled to a host computer 150 and outputs data read from a loaded optical disc 101 (for example, a Blu-ray Disc) to the host computer 150. The optical disc device 100 may have a function of recording data received from the host computer 150 onto a writable optical disc 101.

The optical disc device in this embodiment comprises a spindle motor 102, an I/V converter 109, a signal processor 110, a demodulator 111, an optical-disc identification module 112, a laser driver 113, a memory 115, a data bus 116, an optical pickup 120, and a laser power controller 123.

The spindle motor 102 rotates and drives an optical disc 101 loaded in the optical disc device 100.

The optical pickup 120 comprises an objective lens 103, a splitter 104, a collimating lens 105, a collecting lens 106, a photoelectric converter 107, a laser beam source 108, and a monitor diode 121. When read data from an optical disc 101, the optical pickup 120 irradiates the optical disc 101 with a weak laser beam, reads data recorded on the optical disc 101 using the reflection of the laser beam (return light), and outputs an RF signal corresponding to the reflection.

The laser beam source 108 is a semiconductor laser that generates a desired intensity of laser beam for recording and playing, and emits a laser beam having a wavelength specified for each type of disc to be loaded. The laser beam emitted from the laser beam source 108 impinges on a specific radial position of the recording surface of the optical disc 101 through the collimating lens 105 and the objective lens 103. The objective lens 103 is driven by an actuator to adjust the laser beam to be focused on the disc surface.

In recording data onto the optical disc 101, the laser beam source 108 irradiates the optical disc 101 with a more intensive laser beam than in playing data therefrom. By thermal phase-change at the spot where the laser beam has impinged on the optical disc 101, a recording pit is formed on the recording layer. The recording pit changes the reflectance of the recording layer to record data.

The laser light reflected on the recording surface of the optical disc 101 is split by the splitter 104, collected by the collecting lens 106, and introduced to the photoelectric converter 107. The photoelectric converter 107 converts the received reflected light into an electric signal (an RF signal) and outputs the RF signal corresponding to the return light. It should be noted that a part of the return light enters the laser beam source 108.

The monitor diode 121 is for detecting laser power for APC (Automatic Power Control). The signal bandwidth for the monitor diode may be sufficiently low compared with the high-frequency wave which is superimposed on the laser beam in playing. The monitor diode output signal 122 detected by the monitor diode 121 is sent to the laser power controller 123.

The I/V converter 109 converts a current signal outputted from the photoelectric converter 107 into a voltage signal (an RF signal) and amplifies it. The signal processor 110 is a DSP (Digital Signal Processor), which converts the RF signal outputted from the I/V converter 109 into digital data. The signal processor 110 outputs an optical disc identifier signal differing depending on the structure of the optical disc, a focus error signal for adjusting the focal point of a laser beam, and a tracking error signal for following a track of the optical disc 101.

The demodulator 111 demodulates the digital data outputted from the signal processor 110 in accordance with the format specified for each type of optical disc, performs error detection and error correction on it, and then temporarily stores the demodulated data in the memory 115 (buffer).

The optical disc identification module 112 identifies the type of the loaded optical disc 101 with reference to the optical disc identifier signal outputted from the signal processor 110. The identification result on the optical disc 101 outputted from the optical disc identification 112 is sent to the system controller 114 via the data bus 116. The system controller 114 controls modules to be in optimum conditions (playing conditions and writing conditions) for the identified optical disc based on the identification result of the optical disc.

The laser driver 113 outputs a laser drive signal 117 for driving the laser beam source 108 in the optical pickup 120. The laser power controller 123 sets laser power target values in playing and writing in accordance with the type of the optical disc identified by the optical disc identification module 112.

The system controller 114 comprises a microprocessor for controlling operations of the optical disc device 100 and a memory. The memory in the system controller 114 stores a program to be executed and data necessary for executing the program. The system controller 114 further comprises an interface for controlling sending and receiving of data and commands between the optical disc device 100 and the host computer 150 coupled thereto. The system controller 114 controls reading of data temporarily stored in the memory 115 and writing of data to the memory 115. The system controller 114 interprets a command received from the host computer 150 and processes the received command.

The memory 115 includes a buffer area in which data read from the optical disc 101 is temporarily stored. The data bus 116 connects modules in the optical disc device 100.

Figure 2:
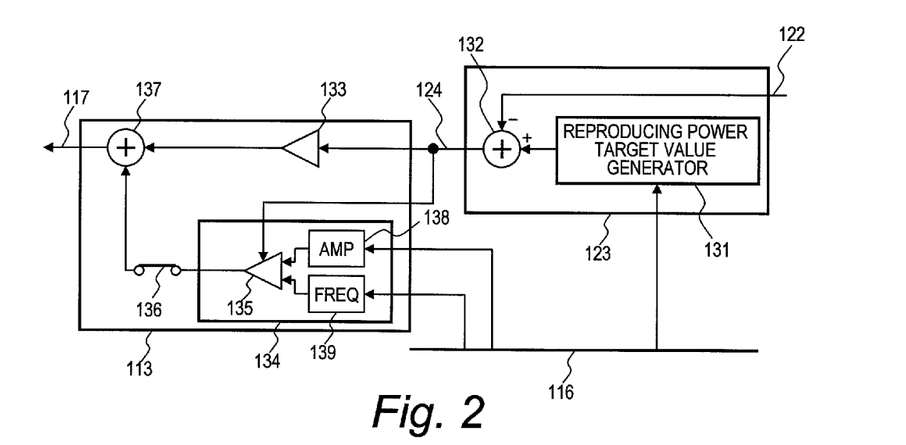
FIG. 2 is a block diagram illustrating a configuration of a laser driver and a laser power controller according to an embodiment of this invention.

FIG. 2 is a block diagram illustrating a configuration of the laser driver 113 and the laser power controller 123.

The laser power controller 123 comprises a playing power target value generator 131 and a subtractor 132.

First, in accordance with the type of the optical disc 101 identified by the optical disc identification module 112, the system controller 114 sets a target value of the average laser power for playing the optical disc on a playing power target value generator 131. The subtractor 132 calculates the difference value 124 between the target value set on the playing power target value generator 131 and the monitor diode's output value 122. The calculated difference value 124 is sent to the laser driver 113.

The laser driver 113 comprises an amplifier 133, a high-frequency signal generator 134, a switch 136, and an adder 137.

The laser driver 113 controls the intensity of the laser beam to be outputted from the laser beam source 108 with the difference value 124 calculated by the laser power controller 123. This control compensates for a temperature change around the laser beam source 108 and a change in the I/L (current to luminance) ratio caused by degradation over time to achieve stable control of the intensity of the laser beam.

The amplifier 133 amplifies a received difference value 124 and sends the amplified value to the adder 137.

The high frequency signal generator 134 comprises a variable gain amplifier 135, an amplitude controller 138, and a frequency controller 139, and generates a high-frequency signal to be superimposed onto the laser drive signal 117.

The amplitude and the frequency of the high-frequency signal to be outputted from the high-frequency signal generator 134, or the amplitude and the frequency of the high-frequency signal to be superimposed onto the playing laser power, can be determined by the system controller 114. Specifically, the amplitude controller 138 controls the amplitude of the high-frequency signal to be superimposed with the value determined by the optical disc identification module 112 or the system controller 114. The frequency controller 139 controls the frequency of the high-frequency signal to be superimposed with the value determined by the optical disc identification module 112 or the system controller 114.

The variable gain amplifier 135 amplifies an amplitude signal outputted from the amplitude controller 138 and the high-frequency signal outputted from the frequency controller 139 with the gain controlled by the difference value 124 to generate a high-frequency signal having a desired amplitude.

The switch 136 controls on and off of the high-frequency signal generator 134.

When the switch 136 is off, the high-frequency signal generator 134 does not output a high-frequency signal, so a high-frequency signal is not superimposed onto the laser output. In this state, the return light, which is light reflected on the surface of the optical disc 101 and incoming into the laser beam source 108, cause interference with resonance cavity of a laser diode included in the laser beam source 108. Thus, the laser beam is emitted with an amplitude tremor. Hence, the signal quality (S/N ratio) is degraded.

On the other hand, in the state in which the amplitude of superimposed high-frequency signal is excessive, an erroneous data is recorded on the optical disc 101 and a recording layer of the optical disc degrades in relation of the peak power of the laser beam in which high-frequency signal is superimposed.

Therefore, the amplitude of superimposed high-frequency signal should be adjusted to moderate amplitude.

The adder 137 adds the output of the amplifier 133 and the output of the high-frequency signal generator 134. The output of the adder 137 is outputted as a laser drive current 117 from the laser driver 113.

Figure 3:
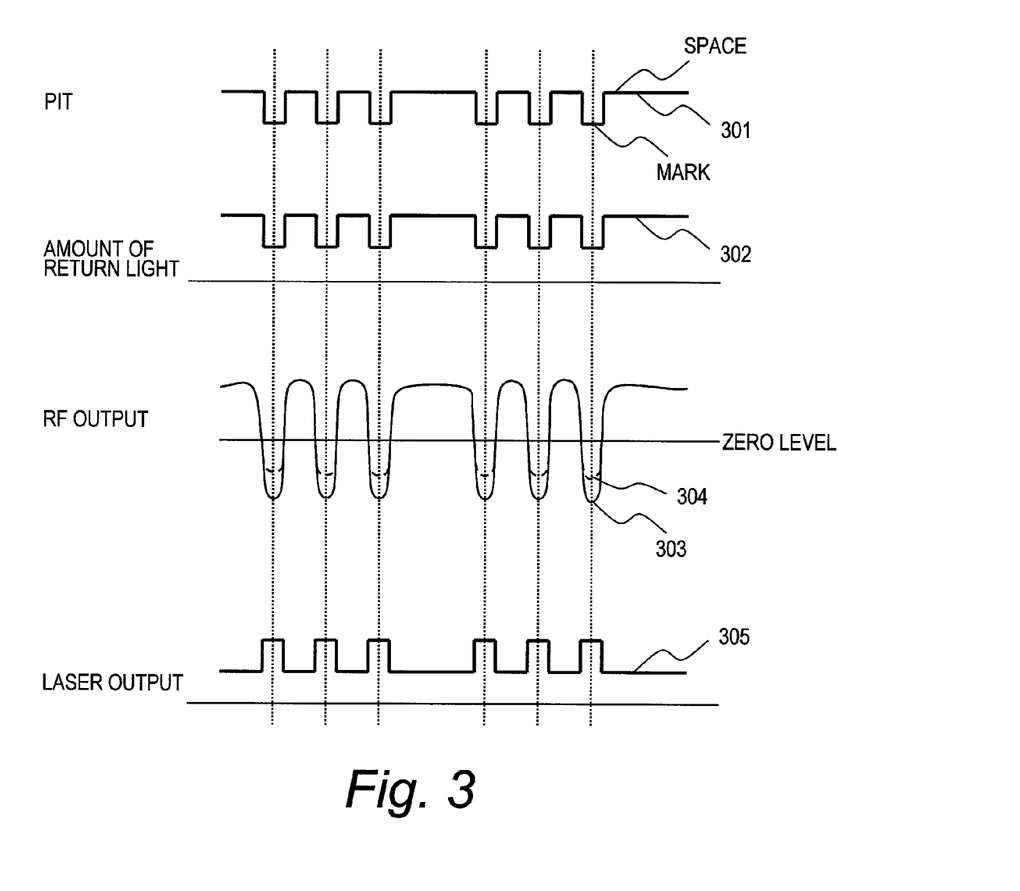
FIG. 3 is an explanatory diagram illustrating a principle that a photoelectric conversion element generates an asymmetric output according to an embodiment of this invention.

FIG. 3 illustrates a principle that the photoelectric converter 107 generates an asymmetric output.

An optical disc, particularly a ROM-type disc e.g. a BD-ROM, has pits 301 formed by indenting a substrate made of synthetic resin (for example, polycarbonate); the amount of the return light 302 changes around a pit. The photoelectric converter 107 detects the change of the return light to read data from the optical disc. Accordingly, the RF signal 303 outputted from the photoelectric converter 107 varies with the amount of reflection 302 (return light).

In general, the reflectance of an optical disc is higher at a space and the amount of the return light is higher. In contrast, the reflectance is lower at a mark and the amount of the return light is lower. Accordingly, the level of the RF output 303 is higher at a space and lower at a mark. The return light from the optical disc 101 is split by the splitter 104 so as not to return to the laser beam source 108. Actually, however, a part of the return light passes through the splitter 104 and enters the laser beam source 108 as return light. When the laser light enters the laser beam source 108, a change in laser output called scoop noise occurs. When a laser beam scans a space, the amount of return light is greater, so that the intensity of the laser beam emitted from the laser beam source 108 diminishes and the RF signal outputted from the photoelectric converter 107 becomes weaker. On the other hand, when a laser beam scans a mark, the amount of return light is smaller, so that the intensity of the laser beam emitted from the laser beam source 108 increases and the RF signal outputted from the photoelectric converter 107 becomes stronger. In this way, the RF signal varies depending on the position of a mark recorded on a disc.

As a result, the level of the RF signal outputted from the photoelectric converter 107 is higher at a space and lower at a mark as indicated by a waveform 304, which is denoted by a dashed line. Namely, the waveform of the RF output is asymmetric between the positive side and the negative side. This is because oscillation within the laser changes by return light to cause noise, so that the laser output changes.

To avoid the RF output from getting asymmetric in this way, the laser beam emitted by the laser beam source 108 is preferably an intermittent beam modulated with a high-frequency signal, instead of a continuous beam. The intermittent beam can suppress laser noise by reducing the interference between the laser beam and the return light, so that symmetry in the RF output can be maintained.

The inventors of this invention have found through measurement that the symmetry of the RF signal outputted from the photoelectric converter 107 differs depending on the type of optical disc between when a high-frequency signal is superimposed on the laser beam emitted by the laser beam source 108 and when a high-frequency signal is not superimposed. In particular, ROM-type discs and R-type discs showed remarkably different symmetries (refer to FIG. 4).

Figure 4:
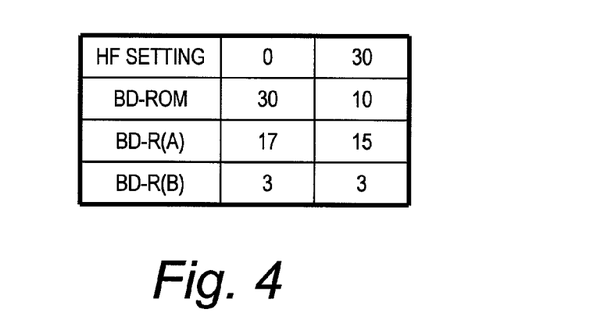
FIG. 4 is an explanatory diagram illustrating measured asymmetry outputted from the photoelectric conversion element according to an embodiment of this invention.

For example, in a BD-ROM disc, the state in continuous radiation (HF OFF) is compared with the state in normal radiation (HF ON). Comparing beta when the HF has been set at a minimum value (HF=0), namely beta in the state of DC playing under the continuous radiation, with beta when the HF has been set at a value for normal playing (HF=30), the value increases by three times. In contrast, in a case of BD-R discs, the values change a little comparing beta when the HF has been set at the minimum value with beta when the HF has been set at 30. Furthermore, when the HF has been set at zero, the beta of the BD-ROM disc is greater than the beta of the BD-R discs.

In the above description, when HF=0, a high frequency signal is not superimposed on the laser drive signal; and when HF=30, it is a normal condition for playing a Blu-ray Disc (a normal data reading state) with a high frequency signal superimposed on the laser drive signal. The data reading state is a state with high frequency wave superimposed, for example, to play management information or user data recorded on the optical disc 101.

The amount of high frequency signal to be superimposed in this normal playing condition is predetermined depending on the type of disc and the number of layers of the disc; the amount of superimposition is set in accordance with the identified type of the disc. In this connection, the amount of the high frequency signal to be superimposed may be determined after adjusting the predetermined initial value depending on the variation of characteristics of the disc. Adjusting the high frequency signal to meet the normal conditions suitable for playing a disc achieves reduction in laser noise and less error rate (SER: Symbol Error Rate) in playing a disc.

Utilizing the characteristic that the asymmetry of the RF signal changes with the setting of the HF, the type of an optical disc can be identified by measuring the asymmetry of the RF signal outputted from the photoelectric converter 107 with change of the amplitude of the high frequency signal superimposed on the laser beam outputted by the laser beam source 108.

The asymmetry of the RF signal can be calculated by Beta expressed in the following Expression (1):

$$\text{Beta} = \frac{(B+A)}{(B-A)} \tag{1}$$

In the Expression (1), A represents an amplitude between a positive peak of the RF signal and the zero level and B represents an amplitude between a negative peak of the RF signal and the zero level. In other words, a value of Beta indicates the extent of unbalance between the positive side amplitude and the negative side amplitude with respect to the total amplitude and is expressed by percent. Although the value of Beta is used as an index in writing data, it may be used in playing data.

The asymmetry of the RF signal can also be calculated by a value of Asymmetry expressed in the following Expression (2):

$$\text{Asymmetry} = \frac{(I_{8H} + I_{8L}) - (I_{2H} + I_{2L})}{2 \times I_{8PP}} \quad (2)$$

In the Expression (2), $I_{8H}$ represents a positive peak voltage of the RF output waveform when reading a 8T mark; $I_{8L}$ represents a negative peak voltage of the RF output waveform when reading the 8T mark. $I_{8PP}$ represents a peak-to-peak voltage of the RF power waveform when reading the 8T mark and can be expressed by $I_{8H}-I_{8L}$. $I_{2H}$ represents a positive peak voltage of the RF power waveform when reading a 2T mark and $I_{2L}$ represents a negative peak voltage of the RF power waveform when reading the 2T mark.

Accordingly, the value of Asymmetry is the ratio of the difference between the center of the signal level when reading the longest 8T mark, $(I_{8H}+I_{8L})/2$, and the center of the signal level when reading the shortest 2T mark, $(I_{2H}+I_{2L})/2$, to the peak-to-peak voltage when reading the longest 8T mark, and is expressed by percent.

The value of Asymmetry and the value of Beta are calculated and outputted by the signal processor 110. The outputted Asymmetry (or Beta) is sent to the optical disc identification module 112 and used in optical disc identification, which will be described later.

Figure 5:
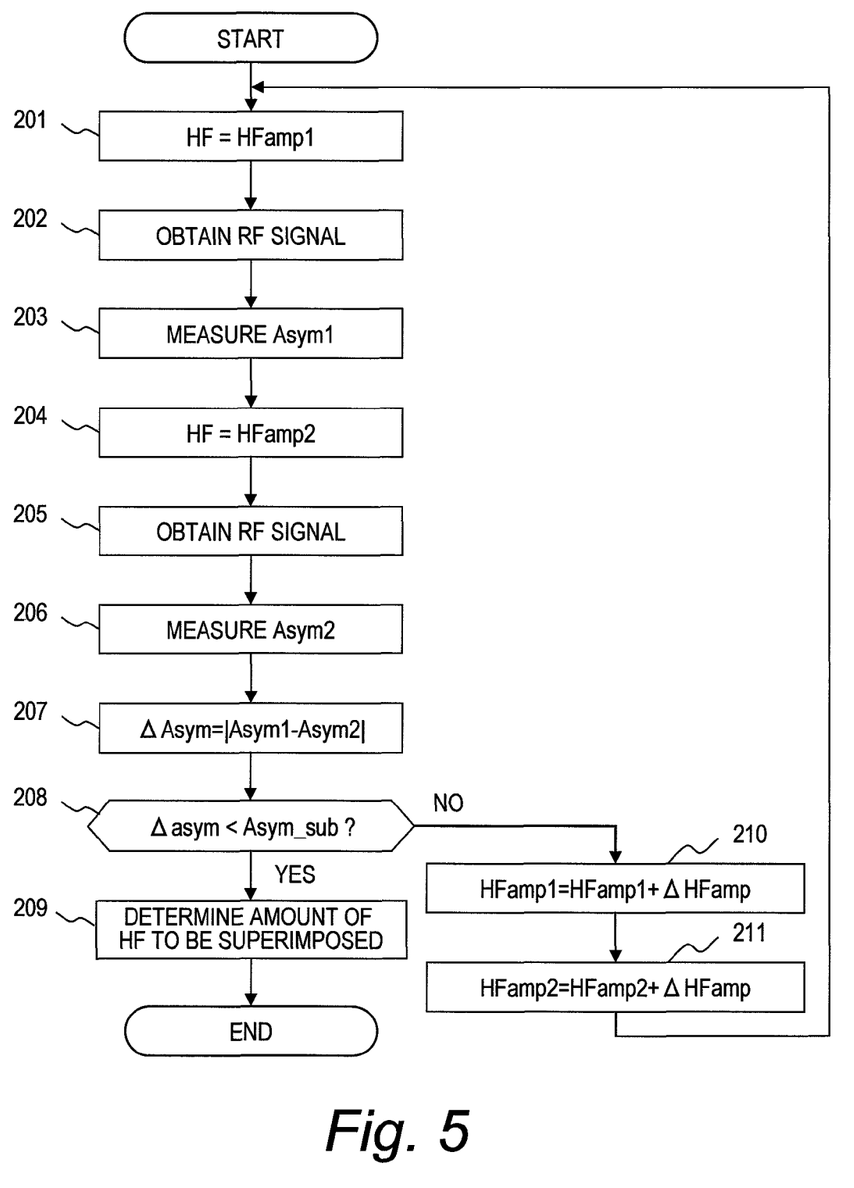
FIG. 5 is a flowchart of an HF adjustment procedure in the optical disc device according to an first embodiment of this invention.

FIG. 5 is a flowchart of an HF adjustment procedure in the optical disc device 100 of a first embodiment of this invention; the procedure is executed by the system controller 114.

First, the optical disc device 100 identifies the type of the loaded optical disc 101, reads management information, adjusts laser power, and adjusts the focus. Then, the focus jumps onto the $L_0$ layer. It is sufficient that tracking adjustment be performed after the HF adjustment illustrated in FIG. 5 (in other words, tracking may be off during the HF adjustment), but it may be performed before the HF adjustment. In these operations, a laser beam with a predetermined initial amount of high frequency signal superimposed is emitted.

Next, the system controller 114 sets an amplitude of high frequency signal, HFamp1, on the high frequency signal generator circuit 134 with tracking either on or off, and irradiates the optical disc 101 with a laser beam in which a high frequency signal is superimposed (201). The HFamp1 is preferably the amplitude for normal data reading, which is predetermined depending on the type of optical disc. The HFamp1 set at the optimum read condition provides a waveform suitable for determining the HF.

Next, the photoelectric converter 107 receives the return light from the optical disc 101 and outputs an RF signal (202). The signal processor 110 calculates the Asymmetry (Asym2) from the RF signal outputted from the photoelectric converter 107 and sends the calculated Asymmetry to the optical disc identification module 112 (203).

The optical disc identification module 112 sets an amplitude of the high frequency signal HF-amp2 on the high-frequency signal generator 134 and irradiates the optical disc 101 with a laser beam in which the high frequency signal is superimposed (204). The HF-amp2 is preferably an amplitude of the high-frequency signal which is not for playing. For example, it may be a minimum amplitude settable to the optical disc device 100 (for example, zero), which is different from the value in normal data reading. This is because, if the amplitude of the superimposed high-frequency signal is zero, the asymmetry of the RF signal outputted from the photoelectric converter 107 will be greatest.

Next, the photoelectric converter 107 receives the return light from the optical disc 101 and outputs an RF signal (205). The signal processor 110 calculates the value of Asymmetry (Asym3) from the RF signal outputted by the photoelectric converter 107 and sends the calculated value of Asymmetry to the optical disc identification module 112 (206).

The system controller 114 obtains the difference (ΔAsym) between Asymmetries Asym1 and Asym2 of RF signals obtained in different conditions of high frequency superposition (207) and compares the obtained difference of Asymmetries (i.e. a variation of Asymmetries) with a predetermined threshold (Asym_sub) (208).

If the variation of the asymmetry is equal to or more than the predetermined threshold, the amplitude of high frequency signal is not in condition suitable for playing the optical disc 101, so the system controller 114 adds a predetermined value (ΔHFamp) to the HFamp1 (210), adds the predetermined value (ΔHFamp) to the HFamp2 (211), and the procedure returns to the step 201 to measure the Asymmetry of the RF signal with a new amplitude of high frequency signal. It should be noted that the system controller 114 may change the amplitude of high frequency signal constantly during a series of measurement, but not at every set of measurement.

On the other hand, if the variation of Asymmetry is smaller than the predetermined threshold, the amplitude of high frequency signal is in condition suitable for playing the optical disc 101, so the system controller 114 determines the average between the HFamp1 and the HFamp2 to be the amount of high frequency signal to be superimposed to play the optical disc (209). The amount of high frequency signal to be superimposed need not be the average between the HFamp1 and the HFamp2 as long as it is either the HFamp1 or the HFamp2, otherwise, any value between HFamp1 and HFamp2.

Although the HF adjustment in the first embodiment determines the amount of high frequency signal to be superimposed using Asymmetry, it may use the above-described Beta.

Otherwise, other properties in playing data may be used (for example, error rate) to determine the definitive amount of high frequency signal to be superimposed.

Next, a modified example of the HF adjustment procedure of the first embodiment will be described.

The HF adjustment procedure in the first embodiment increases the amplitude of high frequency signal starting from the initial value in the optimum reading condition to find the optimum value for the amplitude of high frequency signal as summarized in the following (1). In addition, following modifications (2) and (3) are suggested.

(1) The initial value of the amplitude of high frequency signal: in condition where an optical disc can be played (for example, initially-set normal data reading condition)
Change of the amplitude of high frequency signal: to be increased from the initial value (2) The initial value of the amplitude of high frequency signal: in condition where an optical disc can be played (for example, initially-set normal data reading condition)
Change of the amplitude of high frequency signal: to be decreased from the initial value (3) The initial value of the amplitude of high frequency signal: minimum (a high frequency signal is not superimposed.)

Change of the amplitude of high frequency signal: to be increased from the initial value In the meanwhile, using a plurality of methods in combination, the smallest value of the optimum values obtained by the plurality of methods may be determined to be the amount of high frequency signal to be superimposed. This is because it is preferable that the peak value of the laser power (namely, the amplitude of the high frequency signal to be superimposed) be smaller for the tolerance against impingement of laser beam in playing.

Otherwise, the HF adjustment in the first embodiment described above may be performed in a recovery procedure after the amount of high frequency signal to be superimposed is determined based on an error rate at the initial setting. In this example, at least one of the procedures (1) to (3) may be performed in the recovery procedure. In this regard, the recovery procedure includes a process of resetting the playing condition when data cannot be read because playing condition has not been adjusted appropriately (for example high SER) in initialization.

Figure 6:
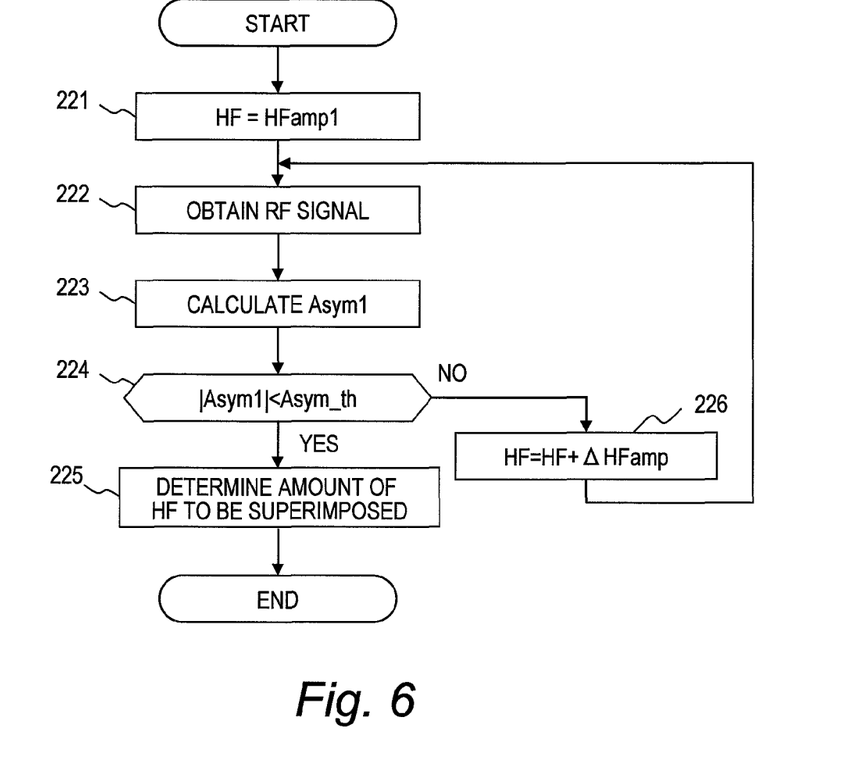
FIG. 6 is a flowchart of an HF adjustment procedure in the optical disc device according to a second embodiment of this invention.

FIG. 6 is a flowchart of an HF adjustment procedure in the optical disc device 100 of a second embodiment of this invention; the procedure is executed by the system controller 114.

The HF adjustment of the second embodiment determines the amount of high frequency signal to be superimposed based on the value of Asymmetry measured in a single HF set value instead of the difference of Asymmetries between two HF set values, unlike the HF adjustment of the first embodiment described above.

First, like the HF adjustment of the first embodiment, the optical disc device 100 identifies the type of the loaded optical disc 101, reads management information, adjusts laser power, and adjusts the focus. Then, the focus jumps to the L0 layer.

Next, the optical disc identification module 112 sets the amplitude of the high frequency signal HF-amp 1 on the high frequency signal generator 134 and irradiates the optical disc 101 with a laser beam in which the high-frequency signal is superimposed (221). The HF-amp1 is preferably a minimum amplitude settable to the optical disc device 100 (for example, zero), which is different from the value in normal data reading. This is because, if the amplitude of the superimposed high-frequency signal is zero, the asymmetry of the RF signal outputted from the photoelectric converter 107 will be greatest.

After that, the photoelectric converter 107 receives the return light from the optical disc 101 and outputs an RF signal (222). The signal processor 110 calculates the value of Asymmetry from the RF signal outputted by the photoelectric converter 107 and sends the calculated value of Asymmetry to the optical disc identification module 112 (223).

The system controller 114 compares the value of Asymmetry (Asym1) of the RF signal outputted from the photoelectric converter 107 with a predetermined threshold (Asym_th) (224). The threshold is preferably the maximum value (or with a given margin added to the maximum value) which is acceptable to the specification as asymmetry.

If the Asymmetry is equal to or more than a predetermined threshold, the amplitude of high frequency signal is out of specification and is not in condition suitable for playing the optical disc 101, so system controller 114 adds a predetermined value (ΔHFamp) to the amplitude of high frequency signal (226). Then the procedure returns to the step 222, and obtains the RF signal outputted from the photoelectric converter element 107. It should be noted that the amplitude of high frequency signal may be constantly changed during a series of measurement, but not at every measurement.

On the other hand, if the Asymmetry is less than the predetermined threshold, the amplitude of high frequency signal is within the specification and is in condition for playing the optical disc 101. So, the system controller 114 determines the current amplitude of high frequency signal to be the amount of high frequency signal to be superimposed for playing the optical disc (225).

Figure 7:
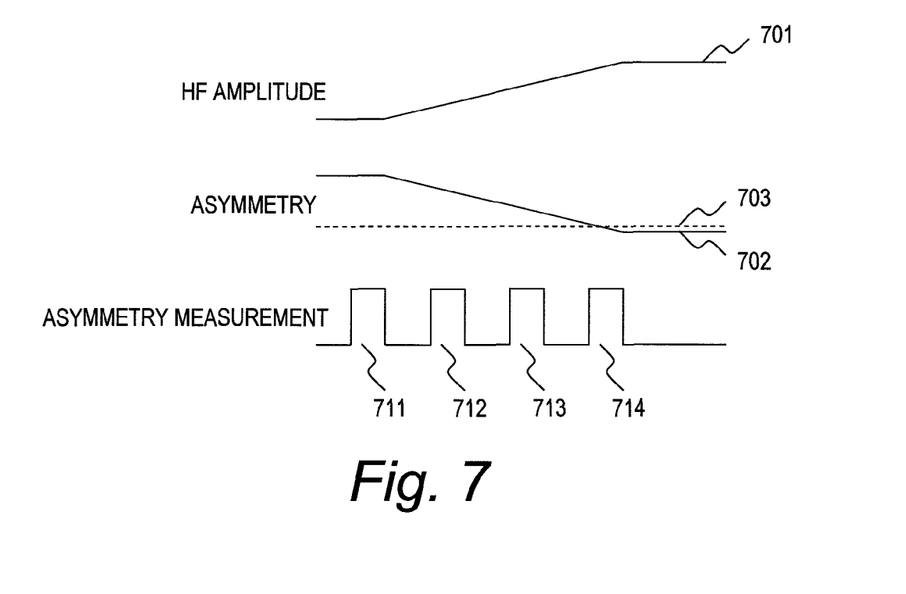
FIG. 7 is an explanatory diagram illustrating the example of measurement of asymmetry with changing an amplitude of high frequency signal according to a HF adjustment procedure of the second embodiment of this invention.

FIG. 7 is a drawing for illustrating the example where the amplitude of high frequency signal is constantly changed in the HF adjustment of the second embodiment of this invention.

As the amplitude of high frequency signal 701 is increased, the Asymmetry 702 decreases. A first measurement of Asymmetry is performed with the amplitude of high frequency signal at the initial value (in the optimum condition for reading which has been set initially) (711).

Thereafter, as the amplitude of high frequency signal is increased, the measurement of Asymmetry is repeated until the Asymmetry becomes less than a predetermined threshold (712, 713). The amplitude of high frequency signal at which the Asymmetry has become smaller than the threshold (the specification value of Asymmetry) 703 is determined to be the amount of high frequency signal to be superimposed for playing the optical disc (714).

As described above, according to the embodiments of this invention, the optimum amplitude of high frequency signal for a loaded disc can be obtained with a simple configuration. Therefore, the peak power of a laser beam can be reduced and its average power can be increased without extra high frequency signal superimposed.

Furthermore, according to the embodiments of this invention, the amount of high frequency signal to be superimposed can be adjusted before playing data from an optical disc (namely, before the process up to decoding).

In particular, if the amplitude of high frequency signal is decreased from the initially set value for the optimum reading condition like in the modification (2) of the first embodiment or if it is increased from the minimum value like in the modification (3), a smaller amount of high frequency signal to be superimposed can be determined.

While the present invention has been described in detail and pictorially in the accompanying drawings, the present invention is not limited to such detail but covers various obvious modifications and equivalent arrangements, which fall within the purview of the appended claims.

What is claimed is:

1. An optical disc device comprising:
  a light source driven by a drive signal with a high frequency signal superimposed;
  a detector for detecting return light emitted from the light source; and
  a controller for controlling amplitude of the high frequency signal which is superimposed on the drive signal for the light source;
  the optical disc device being configured to read data on an optical disc loaded therein by a signal outputted from the detector, wherein
  the controller determines the amplitude of the high frequency signal which is superimposed on the drive signal based on asymmetry of the signal outputted from the detector.

2. The optical disc device according to claim 1, wherein:
  the optical disc device measures the asymmetry of the signal outputted from the detector with a high frequency signal having a first amplitude superimposed on the drive signal; and the controller determines that the amplitude of the high frequency signal which is superimposed on the drive signal is the measured amplitude in a case where the measured first asymmetry is less than a predetermined threshold.

3. The optical disc device according to claim 2, wherein:
default amplitude of the high frequency signal which is superimposed on the drive signal is an amplitude of the high frequency signal which is superimposed in data reading or a minimum value of the amplitude of the high frequency signal; and
the controller changes the amplitude higher than the present amplitude to measure the asymmetry in a case where the first asymmetry is not less than the predetermined threshold.

4. The optical disc device according to claim 2, wherein:
default amplitude of the high frequency signal which is superimposed on the drive signal is an amplitude of the high frequency signal which is superimposed in data reading; and
the controller changes the amplitude lower than the present amplitude to measure the asymmetry in a case where the first asymmetry is not less than the predetermined threshold.

5. The optical disc device according to claim 1, wherein:
the optical disc device measures a first asymmetry of the signal outputted from the detector with the high frequency signal having a first amplitude superimposed on the drive signal;
the optical disc device measures a second asymmetry of the signal outputted from the detector with the high frequency signal having a second amplitude superimposed on the drive signal; and
the controller determines that the amplitude of the high frequency signal which is superimposed on the drive signal is a value between the first amplitude and the second amplitude in a case where the difference between the measured first asymmetry and the measured second asymmetry is less than a predetermined threshold.

6. The optical disc device according to claim 5, wherein:
a default of the first amplitude of the high frequency signal which is superimposed on the drive signal is an amplitude of the high frequency signal which is superimposed in data reading or a minimum value of the amplitude of the high frequency signal;
a default of the second amplitude is greater than the default of the first amplitude; and
the controller changes the first amplitude and the second amplitude higher than the present first and second amplitudes respectively to measure the first and second asymmetries in a case where the difference between the measured first asymmetry and the measured second asymmetry is not less than a predetermined threshold.

7. The optical disc device according to claim 5, wherein:
a default of the first amplitude of the high frequency signal which is superimposed on the drive signal is an amplitude of the high frequency signal which is superimposed in data reading;
a default of the second amplitude is greater than the default of the first amplitude;
the controller changes the first amplitude and the second amplitude lower than the present first and second amplitudes respectively to measure the first and second asymmetries in a case where the difference between the measured first asymmetry and the measured second asymmetry is not less than a predetermined threshold.

8. An optical disc playing method in an optical disc device for reading data from an optical disc loaded therein, the optical disc device having a light source for emitting a laser beam, a detector for detecting return light of the laser light emitted from the light source, and a controller for controlling amplitude of a high frequency signal which is superimposed on a drive signal for the light source, comprising the steps of:
irradiating, by the light source, the optical disc with a laser light in which a high frequency signal is superimposed;
detecting, by the detector, the return light of the laser beam from the light source;
determining, by the controller, the amplitude of the high frequency signal which is superimposed on the drive signal based on asymmetry of a signal outputted from the detector; and
playing, by the optical disc device, the optical disc by irradiating with a laser light in which the high frequency signal having the determined amplitude is superimposed.

* * * * *